United States Patent Office 2,744,088
Patented May 1, 1956

2,744,088

LINEAR POLYESTERS FROM p,p'-SULFONYL DIBENZOIC ACID PLUS ALIPHATIC DIBASIC STRAIGHT CHAIN ACIDS CONDENSED WITH A GLYCOL

John R. Caldwell, Kingsport, Tenn., assignor to Eastman Kodak Company, Rochester, N. Y., a corporation of New Jersey No Drawing. Application December 1, 1954,
Serial No. 472,509

19 Claims. (Cl. 260—75)

This application relates to valuable linear polyesters prepared by condensing 1 mole proportion of a p,p'-sulfonyl dibenzoic diester in conjunction and from 1 to about 15 mole proportions of an aliphatic straight-chain dibasic acid diester containing at least four carbon atoms with an alkylene glycol. These interpolyesters have exceptional dielectric properties and can be used in making sheets, molded objects, electroluminescent lamps, gaskets, coated fabrics, electrical condensers, etc.

It is an object of this invention to provide novel interpolyesters as described herein. It is another object to provide a process as described herein for preparing valuable interpolyesters. Other objects will become apparent hereinafter.

This application is a continuation-in-part of my copending application, Serial No. 313,063 filed October 3, 1952, which is a continuation-in-part of a prior application, now U. S. Patent No. 2,614,120, dated October 14, 1952. In that patent sulfonyl dibenzoic acid is called bis (dicarboxydiphenylsulfone). In application 313,063 the sulfonyldibenzoic content of the polyesters ranges from 50 molecular percent to beyond 90% based on the total dicarboxylic acidic content. In the present application this percentage ranges from a little more than 6% up to 50%. Many properties of the polyesters in each of these applications are distinctly different as is apparent from the descriptions in each specification.

According to my invention it has now been found that p,p'-sulfonyldibenzoic acid or its esters or its acid chloride plus an aliphatic straight-chain dibasic acid or a diester thereof can be condensed with an alkylene glycol and/or an aliphatic ether glycol to produce a new kind of linear interpolyester having highly valuable properties which are superior to those of the linear polyesters described in the prior art. Thus, my new interpolyesters can be prepared having a relatively wide softening range and good flow characteristics whereby they are quite valuable for the production of shaped objects by injection molding or extrusion methods. These novel interpolyesters soften at temperatures which are above 100° C. They are especially valuable in making electroluminescent lamps. The novel interpolyesters described herein are also quite useful in the making of electrical insulation.

The modulus of elasticity of these interpolyesters is unusually low compared to known polyesters; accordingly, these interpolyesters are quite rubbery and resilient. They are highly valuable where a high degree of elastic recovery is desirable, e. g., gaskets, packing, flexible tubing, wrapping materials, coatings for fabrics so as to form simulated leather, etc.

My novel interpolyesters may contain as constituents thereof small percentages of the m,m' and/or the m,p' isomers of the p,p'-sulfonyl dibenzoic compound or the homologs thereof with the effect on the properties of these interpolyesters of lowering the softening temperatures somewhat.

Among the outstanding qualities of the interpolyesters of this invention are their excellent dimensional stability, low degree of water absorptivity, exceptional dielectric properties and high volume resistivity.

The polyester compositions described in this application can be advantageously employed as the resinous component of a composition which contains an electroluminescent pigment incorporated therein. The manufacture of electroluminescent lamps has been under extensive investigation by the industry in an effort to achieve substantial improvements relating to numerous technical difficulties which stand in the way of greater commercial practicability. In the prior art various dielectric materials have been employed as a dispersing medium for the electroluminescent pigment or phosphor as it is sometimes called (see U. S. 2,624,857). The dispersing medium must have exceptional dielectric properties which include a high dielectric constant, high dielectric strength, high volume resistivity, excellent resistance to moisture, and other valuable attributes. Dispersion media which have been employed in the prior art include cellulose nitrate compositions plasticized with any of various plasticizers and transformer oils.

Neither of these types of materials nor others mentioned in the prior art have the overall combination of properties which are attributes of the polyester resins of this invention whereby they can be so advantageously employed in the manufacture of electroluminescent lamps and for other electrical purposes requiring these exceptional properties. Table I is presented to illustrate the valuable properties of the polyesters of this invention as contrasted to the properties of the cellulose nitrate and transformer oil dispersing media mentioned above. In the column headed by the title "Composition" the Ex. numbers refer to the working examples presented hereinbelow wherein the preparation of each of the indicated polyester resins of this invention is described.

TABLE I

*Electric properties of dielectric materials*

| Composition | Dielectric Constant | | | Dielectric Strength, volts per mil. | Volume Resistivity ×10¹⁰ ohms |
|---|---|---|---|---|---|
| | 60 to 100 C. P. S. | 1,000 C. P. S. | 10⁴ to 10⁵ C. P. S. | | |
| Polyester Ex. 1 | | 7.5 | 5.8 | | |
| Polyester Ex. 2 | 6.2 | 5.9 | 5.8 | | |
| Polyester Ex. 3 | 7.0 | 6.5 | 6.2 | 1,500 | 10⁵ |
| Polyester Ex. 4 | 7.7 | 7.4 | 6.2 | | |
| Polyester Ex. 5 | | 6.7 | | | |
| Polyester Ex. 6 | 6.7 | 6.2 | 5.3 | | |
| Polyester Ex. 7 | 5.5 | 4.5 | 4.2 | | |
| Cellulose Nitrate | 7.0 | 7.0 | 6.4 | 250 to 600 | 10 |
| Transformer Oil | 1.9 to 4.7 | | 2.2 to 4.7 | 400 to 550 | 2×10³ |

One embodiment of this invention relates to a process for preparing an interpolyester comprising (A) condensing 1 mole proportion of a sulfonyl dibenzoic compound having the formula

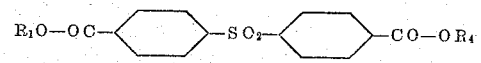

wherein $R_1$ and $R_4$ each represents a substituent selected from the group consisting of a β-hydroxyalkyl radical containing from 2 to 4 carbon atoms, an omega-hydroxyalkyl radical containing from 3 to 12 carbon atoms and an alkyl radical containing from 1 to 6 carbon atoms, plus from 1 up to about 15 mole proportions of an aliphatic acid diester selected from those having the following formula:

$$R_8OOC-(CH_2)_t-COOR_9$$

wherein $t$ represents a positive integer of from 2 to 18, inclusive, and $R_8$ and $R_9$ each represents a substituent selected from the group consisting of an omega-hydroxyalkyl radical containing from 2 to 12 carbon atoms and alkyl radical containing from 1 to 6 carbon atoms, (B) with a dioxy compound selected from the group consisting of those compounds having the following formulas:

$$R_5-O-G-O-R_6$$

and wherein G represents a divalent alkylene radical derived from a glycol containing from 2 to 10 carbon atoms, $R_5$ and $R_6$ each represents a substituent selected from the group consisting of a hydrogen atom and an acyl radical containing from 2 to 4 carbon atoms, the dioxy compound being employed in such a proportion that there is at least an equivalent amount of oxy substituents in proportion to the carbalkoxy substituents in the overall combination of the diesters (i. e. sulfonyl dibenzoic acid and aliphatic acid diesters) and the dioxy compounds, (C) in the presence of a catalytic condensing agent which can be selected from the group including the alkali metals, the alkaline earth metals, the oxides of these two groups of metals, the alkoxides containing from 1 to 6 carbon atoms of these two groups of metals, the carbonates and borates of these two groups of metals, lead oxide, and compounds having the following formulas:

$M(Al(OR)_4)$,
$M(MZr(OR)_6)$, $M'(HZr(OR)_6)_2$,
$MH(Ti(OR)_6)$, $M_2(Ti(OR)_6)$,
$M'(HTi(OH)_6)_2$, $M'(Ti(OR)_6)$,
$(RR'R''R''')_2(Ti(OR)_6)$,
$(RR'R''R''')H(Ti(OR)_6)$,
$Ti(OR)_4$, $PbR_4$ and
$RMgHal$ wherein M represents an alkali metal, M' represents an alkaline earth metal selected from the group consisting of magnesium, calcium and strontium, R represents an alkyl group containing from 1 to 6 carbon atoms, R', R'' and R''' each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

Advantageously, the dioxy compound is employed in such a proportion that there are from about 1.2 to about 3 oxy substituents in proportion to the carbalkoxy substituents in the overall combination of the diesters and the dioxy compounds. Advantageously, the low pressure defined under (F) is less than about 15 mm. of Hg pressure. Advantageously, the elevated temperature employed during the earlier part of the condensation is from about 150° to about 220° C. Advantageously, the dioxy compound is a glycol having the formula.

$$HO-G-OH$$

wherein G is defined under (B) above.

The dioxy compounds defined above may not actually contain any free hydroxy radicals since they may be in esterified form as indicated by the formulas given.

The dioxy compounds which can be employed in accordance with this invention are most advantageously dihydroxy compounds; such compounds will hereinafter be referred to as dihydroxy compounds although it is to be understood that dioxy compounds of the type described above are intended to be covered by this term.

Each diester (i. e. sulfonyl dibenzoic acid or aliphatic acid diester) is considered as containing two carbalkoxy radicals as that term is employed in the definition of the process as described above since $R_1$ and $R_4$ may be alkyl radicals, omego-hydroxyalkyl radicals or β-hydroxyalkyl radicals and $R_8$ and $R_9$ may be alkyl radicals or omega-hydroxyalkyl radicals. Even when the process is preceded by the preliminary step described below employing free acids, the term carbalkoxy radicals in the description of the process is intended to encompass such free carboxy radicals.

Furthermore, this invention covers a process as defined above wherein either or both of the sulfonyl dibenzoic acid diester and the aliphatic dibasic acid diester is/are formed by a preliminary step comprising condensing free p,p-sulfonyl dibenzoic and/or free aliphatic dibasic acid with a dihydroxy compound which is defined under (B) and is employed in the proportions set forth under (B), at an elevated temperature, after which preliminary step the condensing agent which is defined under (C) is added and the condensation is completed as defined under (D), (E) and (F). Advantageously the elevated temperature employed during the preliminary step is substantially that at which reflux conditions subsist; however, higher and lower temperatures can also be employed. Advantageously, as indicated above, the dihydroxy compound is employed in such a proportion that there are from about 1.2 to about 3 hydroxy substituents in proportion to the carboxy and carbalkoxy substituents in the overall combination of the diacids, diesters, and dihydroxy compounds.

The alkylene glycols which can be employed to form highly polymeric linear polyesters include straight-chain alkane diols, viz. polymethylene glycols, wherein the hydroxy radicals are positioned at the two ends of the alkylene chain. Examples of such glycols include ethylene glycol, 1,3-propylene glycol, 1,4-butylene glycol, 1,6-hexylene glycol, 1,10-decamethylene glycol, etc. As indicated above, mono or diesters of these glycols can also be employed. Thus, the acetates, propionates and butyrates are examples of such esters. An ether glycol can also be employed in conjunction with the alkylene glycols as modifiers. Examples of ether glycols include diethylene glycol, triethylene glycol, tetraethylene glycol, bis (4-hydroxybutyl) ether, bis (3-hydroxypropyl) ether, etc. Other alkylene glycols besides polymethylene glycols can be advantageously employed, e. g. 2,2-dimethyl-propanediol-1,3. When branched chain glycols are employed it is preferable to employ those having the following general formula.

$$HO-CH_2-CXY-(CH_2)_p-OH$$

wherein X and Y each represents either an ethyl or a methyl radical and $p$ represents 1, 2 or 3.

The interpolyesters of this invention which contain higher proportions of the aliphatic acid and/or some ether glycol have lower softening temperatures. This effect is also produced when a longer chain-length aliphatic acid is employed in the same proportions as a shorter chain length aliphatic acid. The same effect is created by employing a longer chain (higher carbon content) alkylene glycol. For example, when an 8–10 carbon atom glycol is employed, the amount of aliphatic ether glycol used should be substantially minimized or eliminated so as to maintain a softening temperature above 100° C. However, when a 2–4 carbon atom glycol is employed the amount of ether glycol can be a fairly substantial part of the total quantity of dioxy compounds employed.

The catalytic condensing agents which can be employed have been described above. From about 0.005% to about 0.2% of such catalysts based on the weight of the reactants being condensed can be employed. Higher or lower percentages can also be employed. Generally, from about 0.01% to about 0.05% of the catalytic condensing agent can be advantageously employed based on the weight of the various dibasic acid diesters being condensed.

The temperature at which polyesterification can be conducted is dependent upon the specific reactants involved in any given reaction. In general, the reaction mixture can be heated at from about 150° to about 220° C. for from approximately one to three hours in an inert atmosphere (e. g. nitrogen or hydrogen); the mixture can then be heated at from about 200° to 300° C. in the same atmosphere for from a few minutes up to a couple of hours (or this step can be eliminated). Finally, the pressure can be greatly reduced to form a vacuum (less than about 15 mm. of Hg pressure but preferably on the order of less than 5 mm. of Hg pressure) while the temperature is maintained in the range of 200°–300° C.; these conditions are advantageously maintained for approximately 2 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended. Thus, the extent of the substitution of the sulfonyl dibenzoic diesters with the esters of additional modifying acid necessitates variations in these conditions of temperature, pressure and time periods required. The employment of the novel catalytic condensing agents listed hereinabove results in better products being prepared in much less time than is possible when the catalysts of the prior art are employed.

It has been found that the type of catalyst used has an important bearing upon the properties of the final product. Although most of the catalysts cited in the prior art may be used, it has been found that certain novel catalysts give superior results. The aluminum and titanium alkoxide complexes described in copending applications filed on even date herewith are especially valuable for the preparation of the polyesters described here. Moreover, novel tin catalysts have also been found to be especially effective. See Caldwell Serial No. 313,072, Serial No. 313,078, Caldwell and Reynolds Serial No. 313,077, Wellman and Caldwell Serial No. 313,074, Serial No. 313,075, and Serial No. 313,076 and Wellman Serial No. 313,073 for a description of especially advantageous catalytic condensing agents.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc. can be used as the reaction medium.

It is important to exclude oxygen and moisture at all stages of the condensation reaction. Inert atmospheres which can be advantageously employed include nitrogen, hydrogen, helium etc. Substantially anhydrous reactants can also be advantageously employed although this is not essential, especially if any water is removed in the earlier stages of the condensation.

As indicated above, the acidic constituents of the interpolyesters are employed in the form of their diesters. The omega-hydroxyalkyl diesters can be prepared as described above by heating a polymethylene glycol (or an aliphatic ether glycol) with the free acid, preferably employing an excess of the glycol. The beta-hydroxyalkyl diesters can be prepared as described in my parent application employing an alkylene oxide. The acid chlorides can be employed in some cases although the conditions involved are generally substantially different.

Examples of the various diesters which can be employed in accordance with the process of this invention include the ethyl, propyl, n-butyl, sec-butyl, isopropyl, sec-amyl, n-hexyl, 10-hydroxydecyl, 5-hydroxyamyl, 12-hydroxydodecyl, 2-hydroxyethyl, etc. diesters of either p,p'-sulfonyl dibenzoic acid, or any of the aliphatic straight chain dibasic acids of the type described above. When the novel catalytic condensing agents described hereinabove and in copending applications referred to herein are employed, the simple alkyl esters of these various dibasic acids can be advantageously employed, whereas if the catalysts known to the prior art are employed, the condensation will not proceed as rapidly or as effectively although satisfactory results can be obtained.

The advantageous ratio of p,p'-sulfonyldibenzoic diester to the modifying aliphatic dibasic acid diester will depend upon the type of product desired. As the mole percent of the modifying acid in the polyester is increased, the melting point of the product is lowered.

The products of this invention are linear interpolyesters having exceptional dielectric properties which possess favorable flow characteristics over a temperature differential or range of about 5° to 20° C., a low modulus of elasticity and which contain in the interpolyester configuration a ratio of 1 of one of the following repeating units:

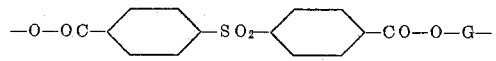

to each 1 to about 15 of one of the following repeating units:

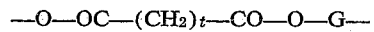

wherein G and $t$ are defined above.

The above described interpolyesters can also have either one or both of the two types of repeating units depicted above replaced in part by a substantial proportion of one of the following repeating units:

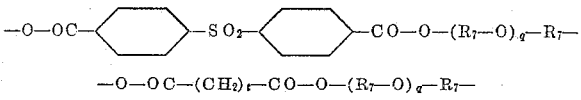

wherein $R_7$ represents an alkylene radical containing from 2 to 4 carbon atoms, $q$ represents a positive integer of from 1 to 10 and $t$ is defined above.

This invention can be further illustrated by the following examples; in addition to these examples it is apparent that other variations and modifications thereof can be adapted to obtain similar results:

*Example 1.—Sulfonyldibenzoate+azelate+butanediol* p,p'-Sulfonyldibenzoic acid dibutyl ester (0.1 gram mols), the diethyl ester of azelaic acid (0.9 gram mols), and tetramethylene glycol (2 gram moles) were placed in a reaction vessel equipped with a stirrer, a distillation column, and an inlet for purified nitrogen. Five cc. of butyl alcohol containing 0.1 g. of sodium titanium butoxide was added as catalyst and the mixture was heated at 190–200° C. with stirring. After about two hours, the evolution of ethyl and butyl alcohols had practically stopped, showing that the ester interchange was complete. The temperature was then raised to 250–260° C. and held for 20 minutes. A vacuum of 0.5 to 1.0 mm. was applied and stirring was continued for about 3 hours. A colorless product was obtained. This product had electrical properties as shown in Table I. It produces strong flexible films when cast from solution in tetrachloroethane. It can be extruded or molded to form rods, sheets, tubes, etc.

*Example 2.—Sulfonyldibenzoate+azelate+butanediol* p,p'-Sulfonyldibenzoic acid dibutyl ester (0.2 gram mols), diethyl azelate, (0.8 gram mol), and tetramethylene glycol (2 gram mols) were placed in a reaction vessel equipped with a stirrer, a distillation column and a gas inlet. Five cc. of butyl alcohol containing 0.1 g. of sodium titanium butoxide was added as catalyst and the mixture was heated at 190–200° C. with stirring. After about two hours, the evolution of ethyl and butyl alcohols had practically stopped, showing that the ester interchange was complete. The temperature was then raised to 250–260° C. and held for 20 minutes. A vacuum of 0.5 to 1.0 mm. was applied and stirring was continued for about 3 hours. A colorless polyester product was obtained. This product had electrical properties as shown in Table I. It had other properties similar to those described in Example 1.

*Example 3.—Sulfonyldibenzoate+azelate+pentanediol*

The procedure described in Example 2 was repeated except that an equivalent molecular proportion of pentamethylene glycol was employed in lieu of the tetramethylene glycol. The polyester product obtained had properties similar to those described in Example 1; also see Table I. The water absorption over a 24 hour period for this polyester was 0.5% by weight. This polyester was found to burn rather slowly. In contrast, both transformer oil and cellulose nitrate burn at a high rate.

*Example 4.—Sulfonyldibenzoate+azelate+neopentanediol*

The procedure described above for Examples 2 and 3 was repeated except that an equivalent molecular proportion of 2,2-dimethylpropane-diol-1,3 was employed in lieu of the polymethylene glycol. The polyester product obtained was soluble in tetrachloroethane, trichloroethane and methylene chloride. It had properties similar to those polyesters described in the preceding examples; also see Table I.

*Example 5.—Sulfonyldibenzoate+azelate+butanediol*

The procedure described in the preceding examples was repeated except that the mol proportions and reactants were as follows: p,p'-sulfonyldibenzoic acid dibutyl ester (0.4 gram mols), azelaic acid diethyl ester (0.6 gram mol) and tetramethylene glycol (1.2 gram mols). The properties were similar to those of the other examples; also see Table I.

*Example 6.—Sulfonyldibenzoate+azelate+pentanediol*

The procedure used in the Example 5 was repeated except that an equivalent mol proportion of pentamethylene, glycol was employed in lieu of the tetramethylene glycol. Certain electrical properties of this polyester are shown in Table I.

*Example 7.—Sulfonyldibenzoate+azelate+neopentanediol*

The procedure described above for Examples 5 and 6 was repeated except that an equivalent mol proportion of 2,2-dimethylpropanediol-1,3 was employed in lieu of the polymethylene glycol. The polyester obtained was soluble in tetrachlorethane and gave strong flexible films when cast from the solution. Some electrical properties are tabulated in Table I.

*Example 8.—Sulfonyldibenzoate+azelate+pentanediol*

The procedure described in the preceding examples was employed except for the following ingredients and proportions: p,p'-sulfonyldibenzoic acid dibutyl ester (0.2 gram mol) azelaic acid dibutyl ester (0.8 gram mol) and octamethylene glycol (1.4 gram mols). The properties were essentially the same except for a lower softening temperature.

*Example 9.—Sulfonyldibenzoate+succinate+ethylene glycol*

The procedure described in the preceding examples was employed except for the following ingredients and proportions: p,p'-sulfonyldibenzoic acid dibutyl ester (0.1 gram mols, i. e. 42 g.) diethyl succinate (0.9 gram mol, i. e. 180 g.) and ethylene glycol (2 gram mols i. e. 124 g.). This product was similar to that described in Example 10 except that it had a higher softening temperature.

*Example 10.—Sulfonyldibenzoate+succinate+butanediol*

Forty-two grams (0.1 gram mol) of p,p'-sulfonyldibenzoic acid dibutyl ester, 157 grams (0.9 gram mol) of diethyl succinate, and 180 grams (2 gram moles) of tetramethylene glycol were placed in a reaction vessel equipped with a stirrer, a distillation column, and a gas inlet. Five cc. of butyl alcohol containing 0.1 g. of sodium titanium butoxide was added as catalyst and the mixture was heated at 190–200° C. with stirring. After about two hours, the evolution of ethyl and butyl alcohols had practically stopped, showing that the ester interchange was complete. The temperature was then raised to 250–260° C. and held for 20 minutes. A vacuum of 0.5 to 1.0 mm. was applied and stirring was continued for about 3 hours. A colorless product was obtained. This product had an inherent viscosity of 0.85 in a solution made up of 60% phenol and 40% tetrachloroethane. This polyester is soluble in tetrachloroethane, trichloroethane, and ethylene dichloride. It gives strong, flexible films when a solution in one of these solvents is cast on a smooth surface. The solutions can also be used to coat or impregnate leather, textiles, or paper to give waterproof products. This polyester is especially valuable as an electrical insulator and as a dielectric for condensers. Films can be made by rolling, casting, or extrusion. The films hold their shape at temperatures of 100° C. and hence are of value as insulating materials in motors, radio equipment, and other electrical devices that operate at elevated temperatures. Solutions of this polyester can be extruded on wire to form a strong, tough insulation that retains its flexibility at temperatures below 0° C.

*Example 11.—Sulfonyldibenzoate+azelate+pentanediol*

Four hundred and twenty g. (1.0 gram mole) of p,p'-sulfonyl dibenzoic acid dibutyl ester, 366 g. (1.5 gram mole) ethyl azelate, and 315 g. (3.0 gram moles) pentanediol-1,5 were placed in a reaction vessel as described in Example 10. A solution of 0.2 g. lithium aluminum ethylate in 5 cc. of ethyl alcohol was added as catalyst and the mixture was stirred at 210–220° C. in an atmosphere of purified nitrogen. The ester interchange was complete in about one hour and the temperature was raised to 260° C. where it was held for 30 minutes. A vacuum of 0.2 mm. was applied and stirring was continued for two hours. The product had an inherent viscosity of 0.72 in 60 phenol-40 tetrachloroethane. This polyester is especially useful as an electrical insulator. Films and foils can be made by extrusion, by rolling, and by casting from solution. The films have a high dielectric constant and retain their shape at a temperature of 120–140° C.

*Example 12.—Sulfonyldibenzoate+sebacate+hexanediol*

The procedure described in the preceding examples was repeated except that the following ingredients and proportions were employed: p,p'-sulfonyldibenzoic acid di butyl ester (0.4 gram mol), sebacic acid diethyl ester (0.6 gram mol), and hexamethylene glycol (2.0 gram mols). The polyester obtained was useful for coating fabrics to make leather substitutes. It is also valuable as a dielectric agent.

*Example 13.—Sulfonyldibenzoate+adipate+octane diol*

The procedure described in the preceding examples was employed except for the use of the following ingredients and proportions: p,p'-sulfonyldibenzoic acid dibutyl ester (0.3 gram mol), adipic acid diethyl ester (0.7 gram mol) and octamethylene glycol (1.9 gram mols). The polyester obtained was useful as a dielectric and an insulator.

Other similar polyesters can be prepared employing the procedures set forth in the preceding examples or employing various modifications in these procedures as indicated in the more general description of this invention set forth hereinabove.

What I claim is:

1. A process for preparing a linear polyester softening between about 100° to about 140° C. having exceptional dielectric properties which comprises (A) condensing 1 mole proportion of a p,p'-sulfonyl dibenzoic diester having the formula:

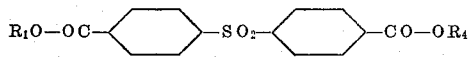

wherein $R_1$ and $R_4$ each represents a substituent selected from the group consisting of a $\beta$-hydroxyalkyl radical containing from 2 to 4 carbon atoms, an omega-hydroxyalkyl radical containing from 3 to 12 carbon atoms and an alkyl radical containing from 1 to 6 carbon atoms, plus from 1.5 up to about 15 mole proportions of an aliphatic diester selected from the group consisting of those having the following formulas:

$$R_8O\text{—}OC\text{—}(CH_2)_t\text{—}CO\text{—}OR_9$$

wherein $t$ represents a positive integer of from 2 to 18, inclusive, and $R_8$ and $R_9$ each represents a substituent selected from the group consisting of an omega-hydroxyalkyl radical containing from 2 to 12 carbon atoms and an alkyl radical containing from 1 to 6 carbon atoms, (B) with a dioxy compound selected from the group consisting of those compounds having the following formulas:

$$R_5\text{—}O\text{—}G\text{—}O\text{—}R_6$$

and $$R_5O\text{—}(\text{—}R_7\text{—}O\text{—})_q\text{—}R_7\text{—}OR_6$$

wherein G represents a divalent alkylene radical derived from a glycol containing from 2 to 10 carbon atoms, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the dioxy compound being employed in such a proportion that there is at least an equivalent amount of oxy substituents in proportion to the carbalkoxy substituents in the overall combination of the diesters and the dioxy compound, (C) in the presence of a catalytic condensing agent (D) at an elevated temperature, (E) the condensation being conducted in an inert atmosphere, and (F) the latter part of the condensation being conducted at a very low pressure of the inert atmosphere, said process encompassing the condensation of only those compounds referred to in (A) and (B) hereinabove.

2. A process as defined in claim 1 wherein the elevated temperature is increased gradually during the course of the condensation up to a temperature of from about 225° to about 310° C.

3. A process as defined in claim 2 wherein the condensing agent is employed in an amount of from about 0.005% to about 0.2% based on the weight of the diesters employed.

4. A process as defined in claim 3 wherein the dioxy compound is employed in such a proportion that there are from about 1.2 to about 3 oxy substituents in proportion to the carbalkoxy substituents in the overall combination of the diesters and the dioxy compounds.

5. A process as defined in claim 4 wherein the elevated temperature employed during the earlier part of the condensation is from about 150° to about 220° C. and the low pressure defined under (F) is less than about 15 mm. of Hg pressure.

6. A process as defined in claim 5 wherein all materials employed in the process are substantially anhydrous.

7. A process as defined in claim 6 wherein the dioxy compound has the formula:

$$HO\text{—}G\text{—}OH$$

wherein G is defined under (B).

8. A process as defined in claim 7 wherein the aliphatic diester is an azelate and the dioxy compound is tetramethylene glycol.

9. A process as defined in claim 7 wherein the aliphatic diester is an azelate and the dioxy compound is pentamethylene glycol.

10. A process as defined in claim 7 wherein the aliphatic diester is an azelate and the dioxy compound is 2,2-dimethylpropanediol-1,3.

11. A process as defined in claim 7 wherein the aliphatic diester is a succinate and the dioxy compound is tetramethylene glycol.

12. A process as defined in claim 7 wherein the aliphatic diester is a sebacate and the dioxy compound is hexamethylene glycol.

13. A linear interpolyester softening between about 100° to about 140° C. having exceptional dielectric properties consisting of a ratio of 1 of one of the following repeating units:

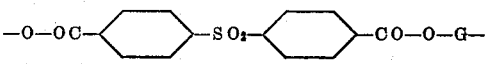

to each 1.5 up to about 15 of one of the following repeating units:

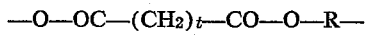

wherein $t$ represents a positive integer of from 2 to 18 and G represents a divalent alkylene radical derived from a glycol containing from 2 to 10 carbon atoms, which interpolyester has a low modulus of elasticity and is capable of being readily formed into shaped objects within its softening range.

14. A linear interpolyester as defined in claim 18 wherein at least one of the repeating units depicted therein is replaced in part by a member selected from the group consisting of the following repeating units corresponding thereto:

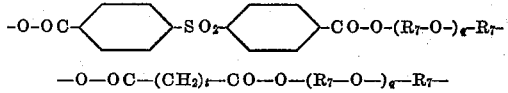

wherein $t$ represents a positive integer of from 2 to 18, $R_7$ represents an alkylene radical containing from 2 to 4 carbon atoms and $q$ represents a positive integer of from 1 to 10.

15. A linear interpolyester as defined by claim 13 where R is a tetramethylene radical and $t$ is 7.

16. A linear interpolyester as defined by claim 13 wherein R is a pentamethylene radical and $t$ is 7.

17. A linear interpolyester as defined by claim 13 wherein R is derived from 2,2-dimethylpropanediol-1,3 and $t$ is 7.

18. A linear interpolyester as defined by claim 13 wherein R is a tetramethylene radical and $t$ is 2.

19. A linear interpolyester as defined by claim 13 wherein R is a hexamethylene radical and $t$ is 8.

References Cited in the file of this patent

UNITED STATES PATENTS

| | | |
|---|---|---|
| 2,547,113 | Drewitt et al. | Apr. 3, 1951 |
| 2,623,033 | Snyder | Dec. 23, 1952 |

FOREIGN PATENTS

| | | |
|---|---|---|
| 621,997 | Great Britain | Apr. 25, 1949 |
| 650,358 | Great Britain | Feb. 21, 1951 |